United States Patent
Yagasaki et al.

(10) Patent No.: US 10,876,615 B2
(45) Date of Patent: Dec. 29, 2020

(54) PULLEY FOR CONTINUOUSLY VARIABLE TRANSMISSION AND METHOD OF PRODUCING PULLEY FOR CONTINUOUSLY VARIABLE TRANSMISSION

(71) Applicant: Honda Motor Co., Ltd., Tokyo (JP)

(72) Inventors: Toru Yagasaki, Saitama (JP); Yasuhiro Yamagata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 16/030,869

(22) Filed: Jul. 10, 2018

(65) Prior Publication Data

US 2019/0048986 A1   Feb. 14, 2019

(30) Foreign Application Priority Data

Aug. 9, 2017 (JP) .................................. 2017-153961
Feb. 1, 2018 (JP) .................................. 2018-016808

(51) Int. Cl.
  *F16H 55/56* (2006.01)
  *B24B 7/04* (2006.01)

(52) U.S. Cl.
  CPC ............. *F16H 55/56* (2013.01); *B24B 7/04* (2013.01)

(58) Field of Classification Search
  CPC . F16H 55/56; F16H 55/38; F16H 9/18; F16H 55/49; F16G 5/166
  USPC .......................................................... 474/8
  See application file for complete search history.

(56) References Cited

U.S. PATENT DOCUMENTS

| 2,187,188 | A | * | 1/1940 | Whitcomb | ............. F16H 55/566 |
| | | | | | 474/42 |
| 2,892,354 | A | * | 6/1959 | Amonsen | ................ F16H 55/56 |
| | | | | | 474/46 |
| 4,692,128 | A | * | 9/1987 | Sadler | ....................... F16G 3/02 |
| | | | | | 474/8 |

(Continued)

FOREIGN PATENT DOCUMENTS

| JP | 2005321090 | 11/2005 |
| JP | 4078126 | 4/2008 |

(Continued)

OTHER PUBLICATIONS

"Office Action of Japan Counterpart Application," with English translation thereof, dated Aug. 28, 2019, p. 1-p. 8.

*Primary Examiner* — Henry Y Liu
(74) *Attorney, Agent, or Firm* — JCIPRNET (57) ABSTRACT

A V surface of a pulley with which a metal element comes in contact includes first grooves extending spirally from a side of a rotation axis of the pulley to an outer side in a radial direction and one side in a circumferential direction, second grooves extending spirally to the outer side in the radial direction and the other side in the circumferential direction, and rhomboid protrusions surrounded thereby. An average circumferential width of the protrusions is smaller at a position on the inner side in the radial direction than at a position on the outer side in the radial direction. Therefore, at a position on the inner side in the radial direction of the V surface in which cracks easily occur, the average circumferential width of the protrusions is lower, such that cracks occurring on the protrusions are prevented by the grooves, and further extension of cracks is prevented.

6 Claims, 12 Drawing Sheets

(56) References Cited

U.S. PATENT DOCUMENTS

| | | | | |
|---|---|---|---|---|
| 4,781,660 | A * | 11/1988 | Amataka | F16H 9/24 474/174 |
| 4,790,799 | A * | 12/1988 | Sadler | F16G 3/02 474/201 |
| 4,947,533 | A * | 8/1990 | Taniguchi | B23B 5/46 29/894 |
| 5,374,221 | A * | 12/1994 | Casada | F16H 9/12 474/29 |
| 6,165,093 | A * | 12/2000 | Salz | F16H 55/38 474/166 |
| 6,254,503 | B1 * | 7/2001 | Chiba | F16H 55/56 29/894 |
| 7,648,435 | B2 * | 1/2010 | Ishida | F16G 5/166 474/8 |
| 7,780,556 | B2 * | 8/2010 | Sakanaka | F16H 55/49 474/8 |
| 7,798,927 | B2 * | 9/2010 | Ishida | F16G 5/166 474/8 |
| 7,806,793 | B2 * | 10/2010 | Yoshida | F16H 55/56 474/188 |
| 7,857,721 | B2 * | 12/2010 | Ishida | F16H 55/56 474/188 |
| 7,958,635 | B2 * | 6/2011 | Yoshida | B24B 39/04 29/892.11 |
| 9,371,902 | B2 * | 6/2016 | Van Der Heijde | F16H 9/18 |
| 9,714,700 | B2 * | 7/2017 | Briggs | C23C 14/0641 |
| 2001/0053727 | A1 * | 12/2001 | Nakashima | F16G 5/166 474/242 |
| 2005/0217111 | A1 * | 10/2005 | Yoshida | B24B 39/04 29/892 |
| 2007/0004543 | A1 * | 1/2007 | Ishida | F16G 5/166 474/8 |
| 2007/0200208 | A1 * | 8/2007 | Wang | F16H 55/17 257/668 |
| 2008/0015067 | A1 * | 1/2008 | Ishida | F16H 55/56 474/14 |
| 2008/0015068 | A1 * | 1/2008 | Ishida | F16H 55/56 474/14 |
| 2009/0036240 | A1 * | 2/2009 | Sakanaka | F16G 5/166 474/8 |
| 2012/0088615 | A1 * | 4/2012 | Briggs | C23C 14/0641 474/8 |
| 2015/0080158 | A1 * | 3/2015 | Van Der Heijde | F16H 9/18 474/43 |

FOREIGN PATENT DOCUMENTS

| | | |
|---|---|---|
| JP | 2011137492 | 7/2011 |
| JP | 2017036772 | 2/2017 |

* cited by examiner

PULLEY FOR CONTINUOUSLY VARIABLE TRANSMISSION AND METHOD OF PRODUCING PULLEY FOR CONTINUOUSLY VARIABLE TRANSMISSION

CROSS-REFERENCE TO RELATED APPLICATION

This application claims the priority of Japan patent application serial no. 2017-153961, filed on Aug. 9, 2017 and Japan patent application serial no. 2018-016808, filed on Feb. 1, 2018. The entirety of each of the above-mentioned patent applications is hereby incorporated by reference herein and made a part of this specification.

BACKGROUND

Technical Field

The present disclosure relates to a pulley for a continuously variable transmission with high durability against cracks on a V surface and a method of producing the pulley.

Description of Related Art

The following Patent Document 1 discloses that, when a shot peening treatment is performed on a V surface of a pulley of a belt type continuously variable transmission, a residual stress with a peak value that is equal to or less than a predetermined value is imparted to a region with a depth of 50 μm from the V surface, and also a coefficient of friction of the V surface increases, the wear resistance and fatigue strength of the pulley increase.

In addition, the following Patent Document 2 discloses that, when protrusions that protrude in a latticed form are formed on an inner circumferential surface of a metal ring of a metal belt of a belt type continuously variable transmission and an average width of the protrusions in a direction orthogonal to a direction in which the metal belt progresses is set to 16 m or less, extension of cracks occurring on the top of the protrusions due to contact with the metal element is prevented and the durability of the metal ring increases.

PATENT DOCUMENTS

[Patent Document 1] Japanese Laid-open No. 2017-36772
[Patent Document 1] Japanese Patent No. 4078126

SUMMARY

However, in the technique described in Patent Document 1, it is possible to delay the occurrence of cracks due to a change in structure of a V surface of a pulley generated by sliding against a metal ring, but it is difficult to reliably prevent the extension of cracks.

In addition, in the technique described in Patent Document 2, in order to evaluate an average width of protrusions of a metal ring, it is necessary to measure a high spot count (HSC) of the protrusion. However, there are problems that the measurement accuracy of the high spot count (HSC) may decrease depending on the shape of the protrusion and a measurement device with high accuracy needs to be used.

The present disclosure has been made in view of the above circumstances and an object of the present disclosure is to increase the durability of a pulley by preventing extension of cracks on a V surface of a pulley of a belt type continuously variable transmission.

An embodiment of the disclosure proposes a pulley for a continuously variable transmission in which a V surface of a pulley with which a metal element comes in contact includes a plurality of first grooves that extend spirally from a side of a rotation axis of the pulley to the outer side in a radial direction and one side in a circumferential direction, a plurality of second grooves that extend spirally from the side of the rotation axis to the outer side in the radial direction and the other side in the circumferential direction, and a plurality of rhomboid protrusions that are surrounded by the first grooves and the second grooves, wherein an average circumferential width of the protrusions is smaller at a position on the inner side in the radial direction than at a position on the outer side in the radial direction of the V surface.

In addition, an embodiment of the disclosure proposes a pulley for a continuously variable transmission in which, in addition to the configuration of claim 1, an average radial width of the protrusions before a durability test is 4 μm or more and 16 μm or less.

In addition, an embodiment of the disclosure proposes a method of producing a pulley for a continuously variable transmission according to claim 1 or 2 including forming the first grooves and the second grooves on the V surface by reciprocating a sandpaper or a honing stone that is brought into contact with the V surface in the radial direction at a certain speed and lapping or honing the V surface while rotating the pulley around the rotation axis at a certain rotational speed.

In addition, an embodiment of the disclosure proposes a method of producing a pulley for a continuously variable transmission in which, in addition to the configuration of claim 3, the average circumferential width of the protrusions is evaluated based on an average length of roughness curve elements on the V surface, and a lapping time or a honing time of the V surface is set so that the average circumferential width is a predetermined value or less.

Here, a drive pulley 13 of an embodiment corresponds to a pulley of the present disclosure.

According to the configuration according to an embodiment of the disclosure, the V surface of the pulley with which a metal element comes in contact includes a plurality of first grooves that extend spirally from a side of a rotation axis of the pulley to the outer side in a radial direction and one side in a circumferential direction, a plurality of second grooves that extend spirally from the side of the rotation axis of the pulley to the outer side in the radial direction and the other side in the circumferential direction, and a plurality of rhomboid protrusions that are surrounded by the first grooves and the second grooves. An average circumferential width of the protrusions is smaller at a position on the inner side in the radial direction than at a position on the outer side in the radial direction of the V surface. Therefore, at a position on the inner side in the radial direction of the V surface in which cracks easily occur due to a large contact surface pressure and slip amount with respect to the metal element, an average circumferential width of the protrusions is lower. As a result, cracks occurring on the protrusions are prevented by the first grooves or the second grooves, and do not exceed the width of the protrusions that is short in the radial direction, and further extension of cracks is prevented and the durability of the V surface of the pulley is improved.

In addition, according to the configuration according to an embodiment of the disclosure, since the average radial width of the protrusions before the durability test is 4 μm or more, the average radial width of the protrusions after the durability test is prevented from being less than 4 µm. Wear on the metal element that is in slidably contact with the V surface of the pulley when the gear ratio is changed is prevented so that the durability can be ensured, and also the average radial width of the protrusions after the durability test is 16 µm or more and thus extension of cracks occurring on the protrusions is reliably prevented so that the durability of the V surface of the pulley can increase.

In addition, according to the configuration according to an embodiment of the disclosure, the first grooves and the second grooves are formed on the V surface by reciprocating a sandpaper or a honing stone that is brought into contact with the V surface in the radial direction at a certain speed and lapping or honing the V surface while rotating the pulley around the rotation axis at a certain rotational speed. Thus, the shapes of the first groove and the second groove can become automatically spiral, and it is possible to easily form protrusions with an average circumferential width that is smaller at a position on the inner side in the radial direction than at a position on the outer side in the radial direction of the V surface.

In addition, according to the configuration according to an embodiment of the disclosure, the average circumferential width of the protrusions is evaluated based on an average length of roughness curve elements on the V surface, and a lapping time or a honing time of the V surface is set so that the average circumferential width is a predetermined value or less. Therefore, when an average length of the roughness curve elements with high measurement accuracy, which is easily measured compared to the high spot count, is used, it is possible to easily form the protrusions with high accuracy in the average circumferential width.

DESCRIPTION OF THE EMBODIMENTS

Embodiments of the present disclosure will be described below with reference to FIG. 1 to FIG. 12.

Figure 1:
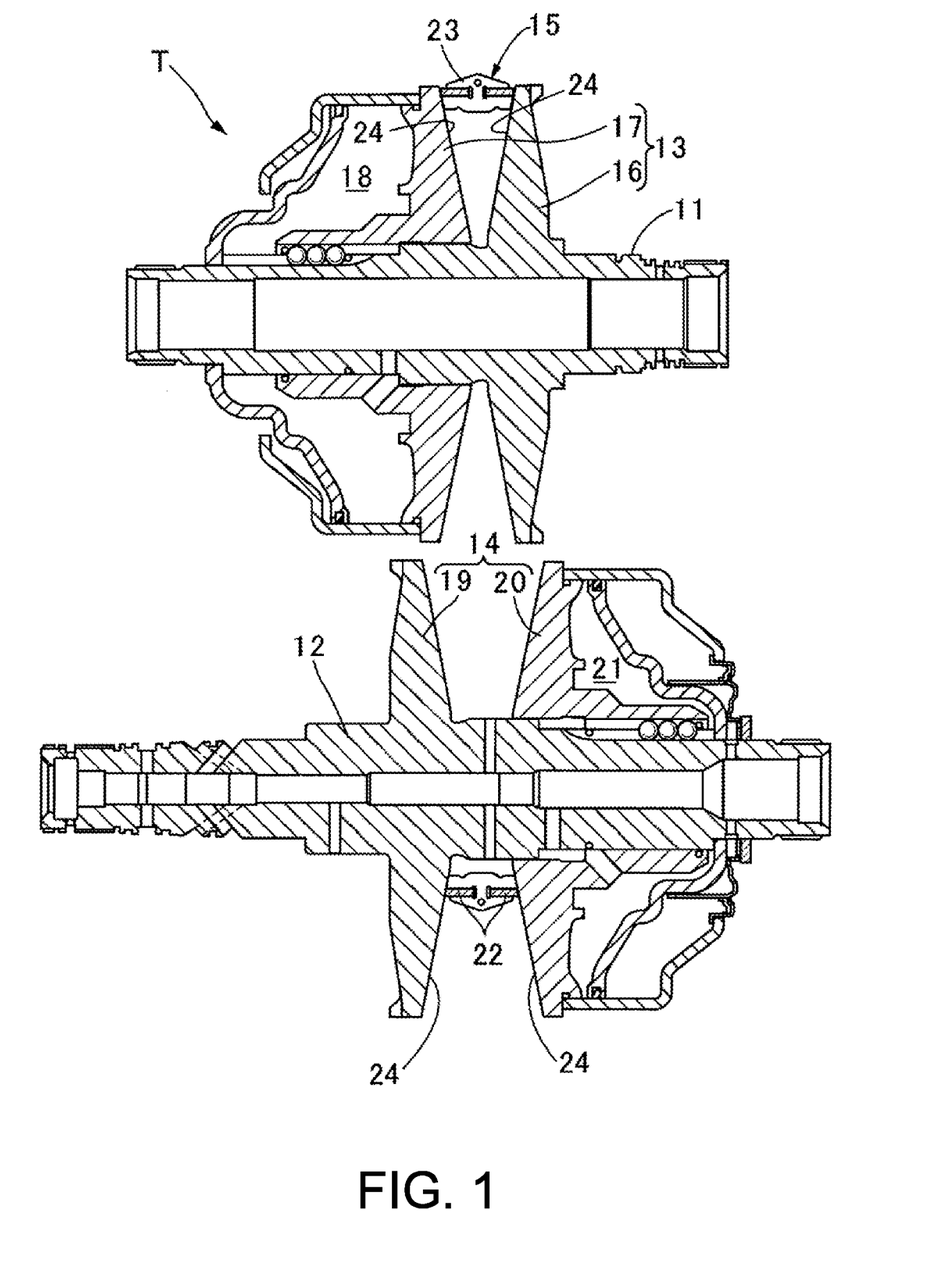
FIG. 1 is a diagram showing the entire configuration of a belt type continuously variable transmission.

FIG. 1 shows a schematic structure of a belt type continuously variable transmission T mounted on an automobile. The belt type continuously variable transmission T includes a drive shaft 11 connected to an engine and a driven shaft 12 connected to a drive wheel. An endless metal belt 15 is wound around a drive pulley 13 provided on the drive shaft 11 and a driven pulley 14 provided on the driven shaft 12. The drive pulley 13 includes a fixed side pulley half 16 fixed to the drive shaft 11 and a movable side pulley half 17 that is detachable from the fixed side pulley half 16. The movable side pulley half 17 is biased toward the fixed side pulley half 16 with hydraulic pressure that acts on an oil chamber 18. The driven pulley 14 includes a fixed side pulley half 19 fixed to the driven shaft 12 and a movable side pulley half 20 that is detachable from the fixed side pulley half 19. The movable side pulley half 20 is biased toward the fixed side pulley half 19 with hydraulic pressure that acts on an oil chamber 21.

Figure 2:
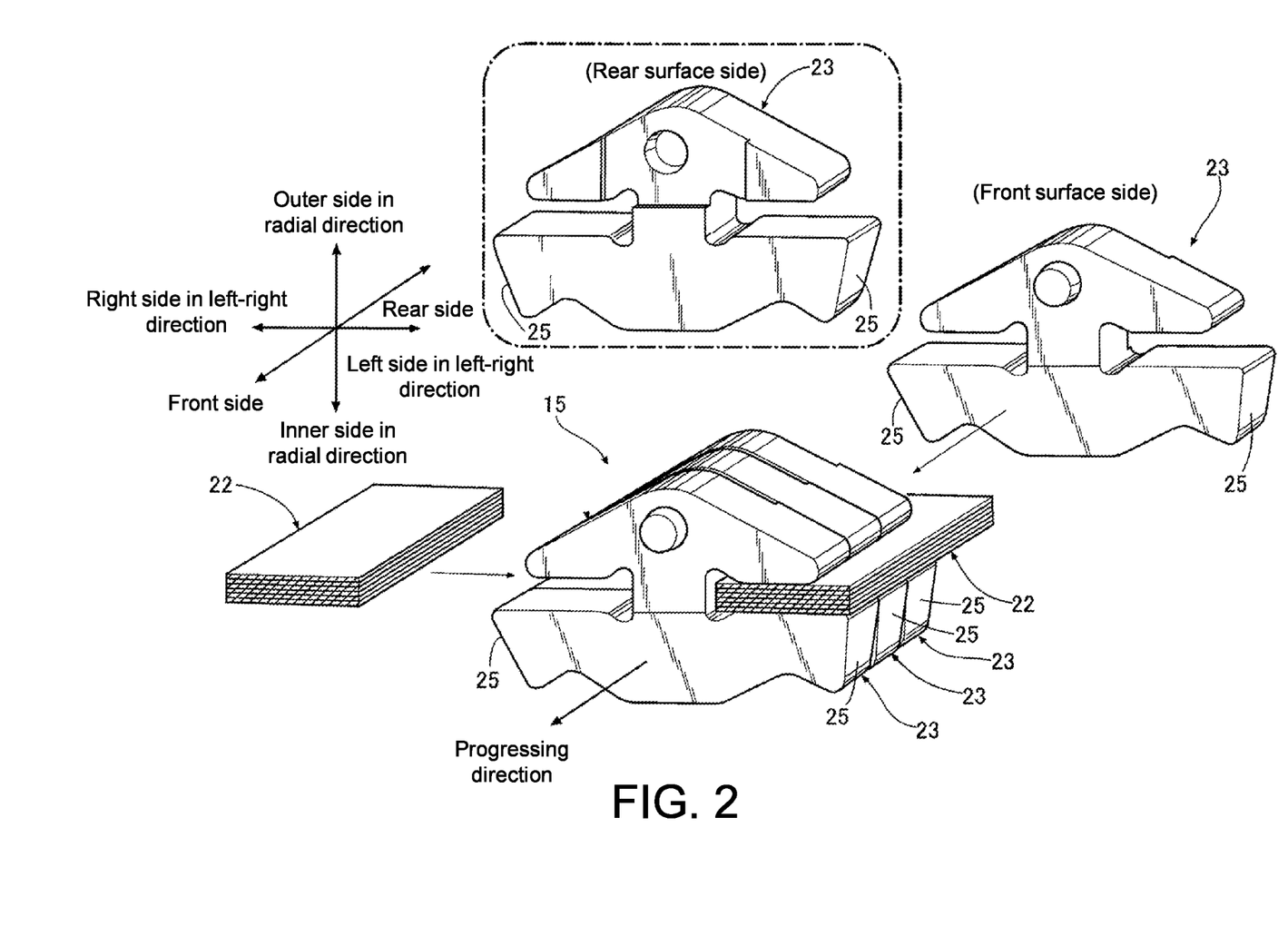
FIG. 2 is a perspective view of a metal belt and a metal element.

As shown in FIG. 2, in the metal belt 15, a plurality of metal elements 23 are supported on a pair of left and right metal rings 22. At both left and right ends of the metal elements 23, pulley contact surfaces 25 that are brought into contact with V surfaces 24 of the drive pulley 13 and the driven pulley 14 are formed.

Figure 3:
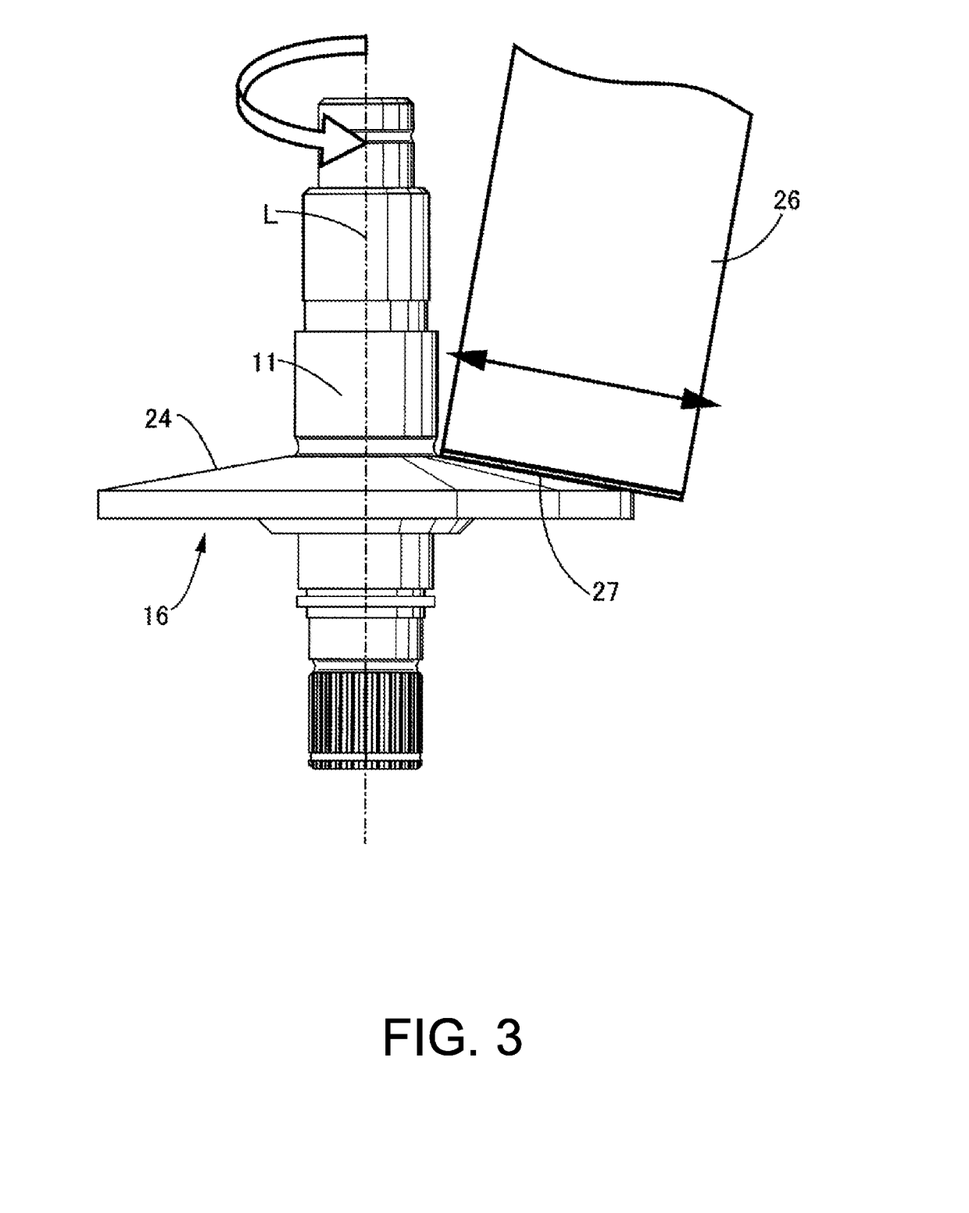
FIG. 3 is a diagram showing a processing device configured to form grooves and protrusions on a V surface of a pulley.

FIG. 3 shows a lapping processing device for processing the V surface 24 of the fixed side pulley half 16 of the drive pulley 13. The fixed side pulley half 16 of the drive pulley 13 is rotated and driven by a driving source (not shown) at a certain rotational speed with respect to a rotation axis L of the drive shaft 11. On the other hand, at the tip of a polishing member 26, sandpaper 27 that is brought into contact with the V surface 24 at a predetermined surface pressure is provided. The polishing member 26 is reciprocated in a radial direction of the V surface 24 by a driving source (not shown) at a certain speed. As a result, a plurality of grooves are formed on the V surface 24 lapped by the sandpaper 27 by abrasive grains of the sandpaper 27.

Here, while the lapping processing device is shown in FIG. 3, the same effect can be obtained using a honing processing device in which the sandpaper 27 is replaced with the honing stone 27.

Figure 4:
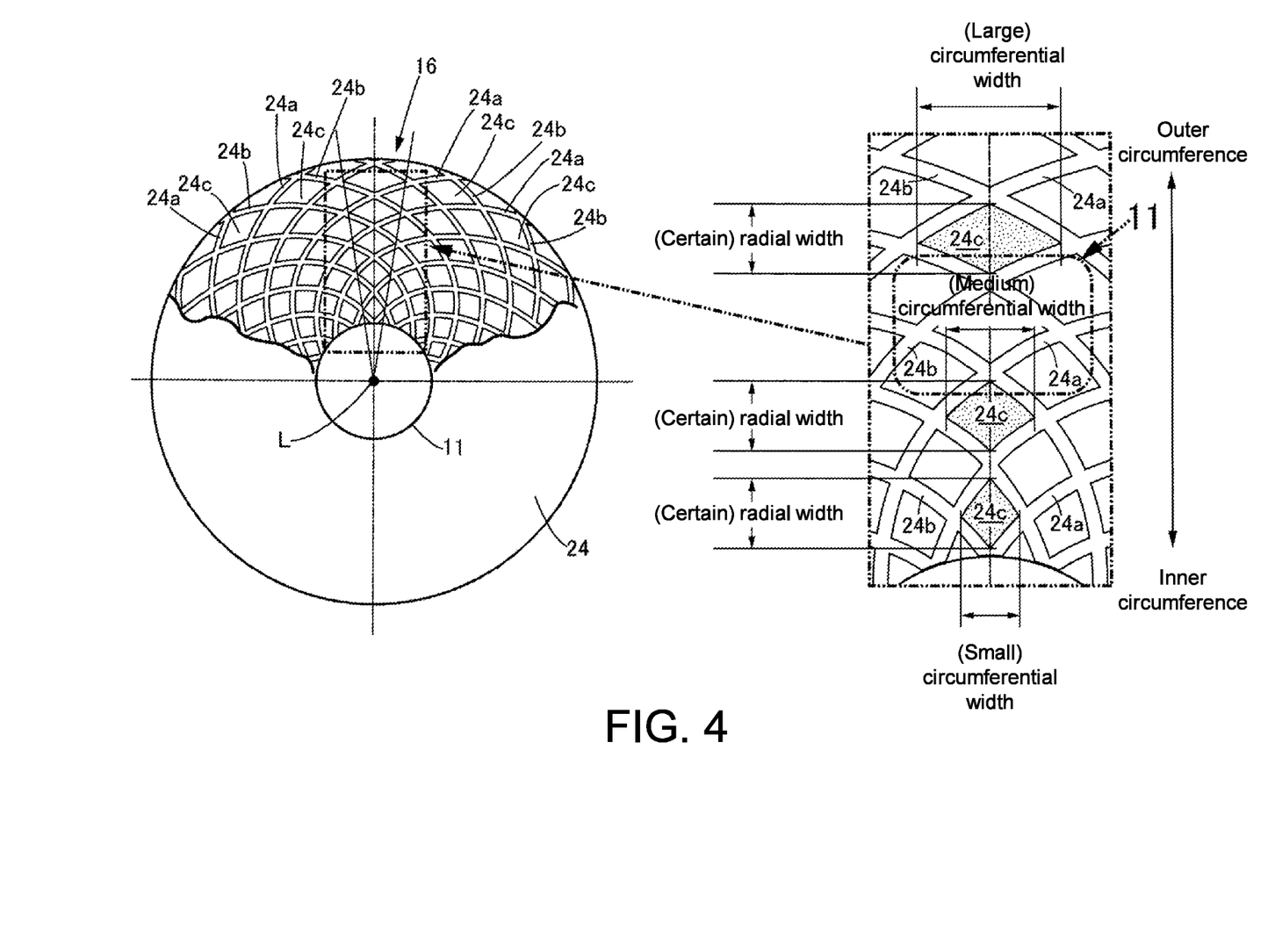
FIG. 4 is a diagram showing shapes of grooves and protrusions of the V surface of the pulley.

FIG. 4 shows the V surface 24 lapped by the sandpaper 27. When the reciprocating polishing member 26 moves from the inner side to the outer side of the V surface 24 in the radial direction, a plurality of spiral first grooves 24a inclined toward one side in the circumferential direction and around the rotation axis L of the drive shaft 11 are formed on the V surface 24 by abrasive grains of the sandpaper 27. When the polishing member 26 moves from the outer side to the inner side of the V surface 24 in the radial direction, a plurality of spiral second grooves 24b inclined toward the other side in the circumferential direction are formed. The reason why the first groove 24a and the second groove 24b have a spiral shape is that the polishing member 26 moves in the radial direction at a certain speed, but a peripheral velocity of the V surface 24 is low at a position on the inner side in the radial direction of the V surface 24 and is high at a position on the outer side in the radial direction of the V surface 24.

As a result, on the V surface 24 after lapping is completed, a plurality of rhomboid protrusions 24c that are surrounded by the first grooves 24a and the second grooves 24b that cross each other are formed. Since the first groove 24a and the second groove 24b have a spiral shape, the shape of the rhomboid protrusion 24c varies according to a position in the radial direction of the V surface 24. That is, when a radial width Wr of the protrusion 24c is assumed to be a certain value determined by an interval between abrasive grains of the sandpaper 27, a circumferential width Wt of the protrusion 24c depends on an inclination angle of the spiral first groove 24a and the spiral second groove 24b, and is small at a position on the inner side in the radial direction of the V surface 24 and large at a position on the outer side in the radial direction of the V surface 24.

As described above, since the plurality of protrusions 24c are formed on the V surface 24 of the drive pulley 13 and the driven pulley 14, and the pulley contact surface 25 of the metal element 23 is brought into contact with the protrusions 24c, the top of the protrusion 24c may become fatigued and cracks may occur, and there is a problem that the durability of the V surface 24 deteriorates due to extension of the cracks. In particular, in a part on the inner side in the radial direction of the drive pulley 13, since a winding diameter of the metal belt 15 is small at a LOW gear ratio, and the number of metal elements 23 that are brought into contact therewith is small, there are problems that a contact surface pressure of the metal element 23 is higher than that of the part on the outer side in the radial direction and cracks may easily occur.

When cracks occurring on the top surface of the protrusion 24c gradually extend, since cracks that have reached the first groove 24a or the second groove 24b that surrounds the protrusion 24c are prevented from extending further, the durability of the V surface 24 is ensured. Therefore, an average size of the protrusions 24c on the V surface 24 is evaluated, and when the average size is a predetermined value or less, durability of the V surface 24 against cracks can be ensured.

Figure 5:
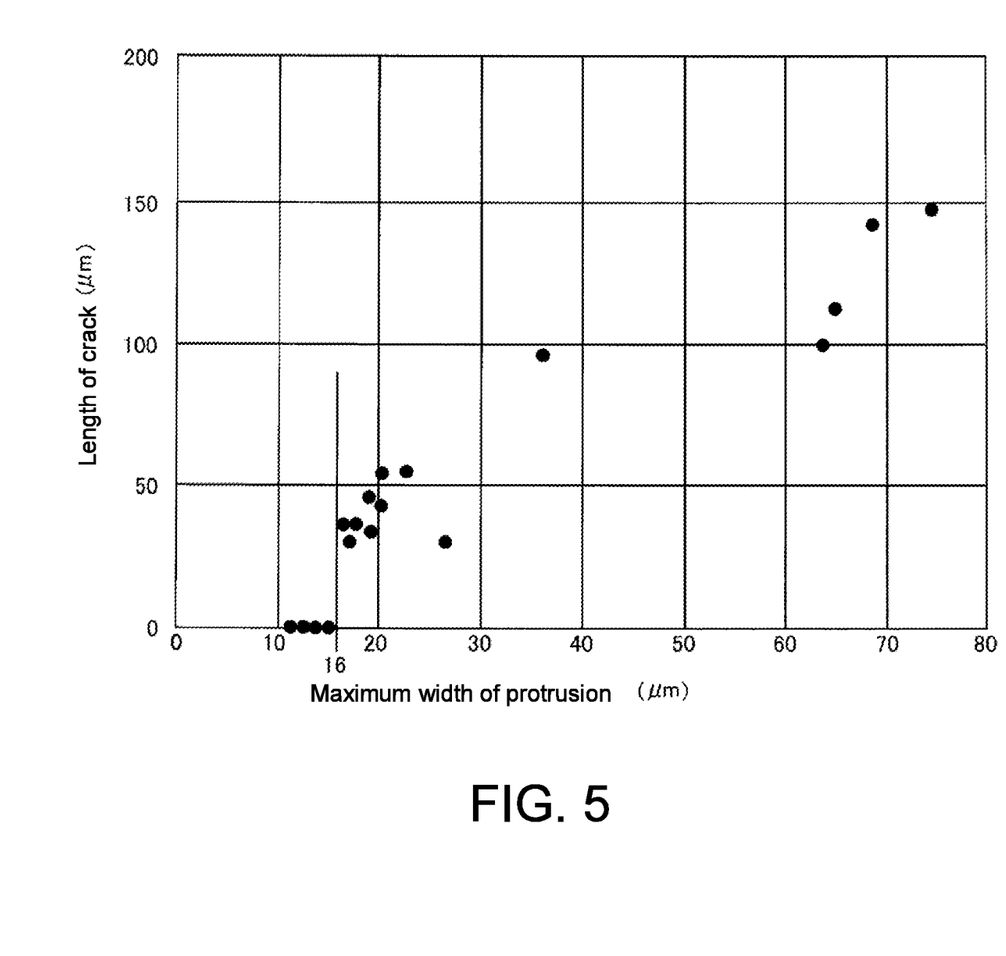
FIG. 5 is a graph showing a relationship between a width of a protrusion of a ring mesh and a length of a crack.

FIG. 5 is a graph showing a relationship between a width of a ring mesh (a lattice protrusion of an inner circumferential surface of a metal ring) and a length of a crack.

The horizontal axis represents a maximum width of a protrusion of a mesh surface after initial wear and the vertical axis represents a length of a crack occurring in a protrusion. In the case of a ring mesh, as can be clearly understood from FIG. 5, when a maximum width of a protrusion exceeds 16 µm, cracks occur, and when a maximum width of a protrusion is 16 µm or less, no cracks occur at all.

When a maximum width of a protrusion after initial wear is 16 µm or less, it is possible to prevent the occurrence of cracks. The reason for this is that, even if a minute crack (pitching) occurs at the top of a protrusion with a narrow width, the crack does not extend in a depth direction because the width of the top of the protrusion is narrow, and even if the crack extends along the top, it stops at an end of the protrusion and is prevented from extending further, and a shallow crack at the top is scraped off and disappears according to contact with a saddle surface of the metal element. When the top of the mesh protrusion and the saddle surface of the metal element are fitted together, a mean Hertz surface pressure decreases and cracks are unlikely to occur. In addition, since the top of the protrusion wears and surface roughness becomes significantly favorable, the lubricity is improved and further progress of wear is stopped. The same phenomenon also occurs on the V surface 24 of the pulley.

There is a variation in size of the protrusions 24c on the V surface 24. However, it is thought that, when an average width thereof is 16 µm or less, the occurrence of cracks can be prevented. In order to set an average width of the protrusions 24c on the V surface 24 to 16 µm or less, it is necessary to measure and evaluate widths of the protrusions 24c.

Figure 6:
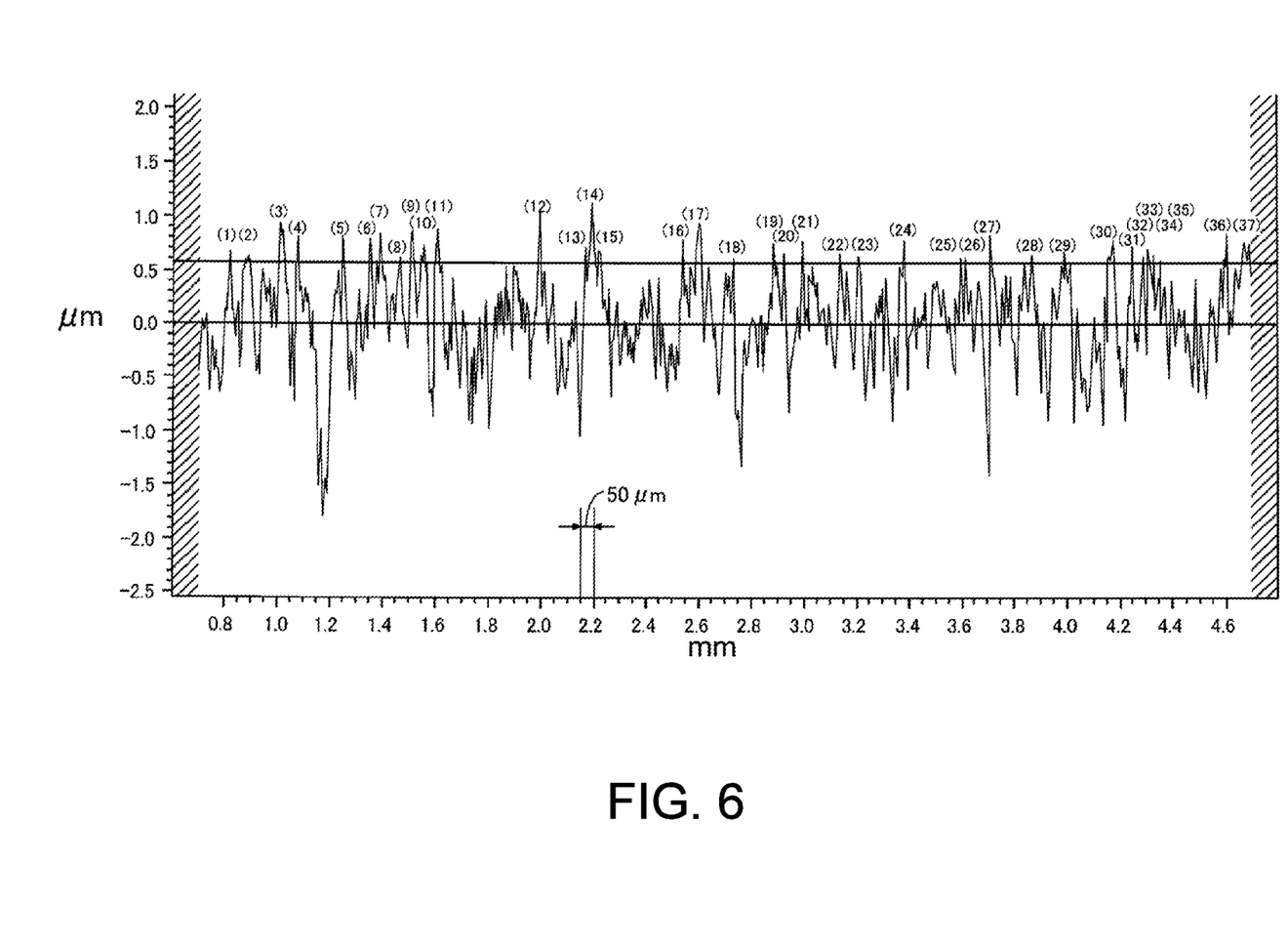
FIG. 6 is an enlarged view of a ring mesh in an uneven state.

FIG. 6 is an enlarged view of a ring mesh in an uneven state and shows an uneven shape of a part (a length L with a range of 4 mm in the radial direction) of a mesh surface that is enlarged, and there are 37 high spot counts (HSCs) in the length L with a range of 4 mm.

However, in the present embodiment, the length L is set in the radial direction of the V surface 24. This is because it is difficult to measure high spot counts (HSCs) in the circumferential direction of the V surface 24.

Figure 7:
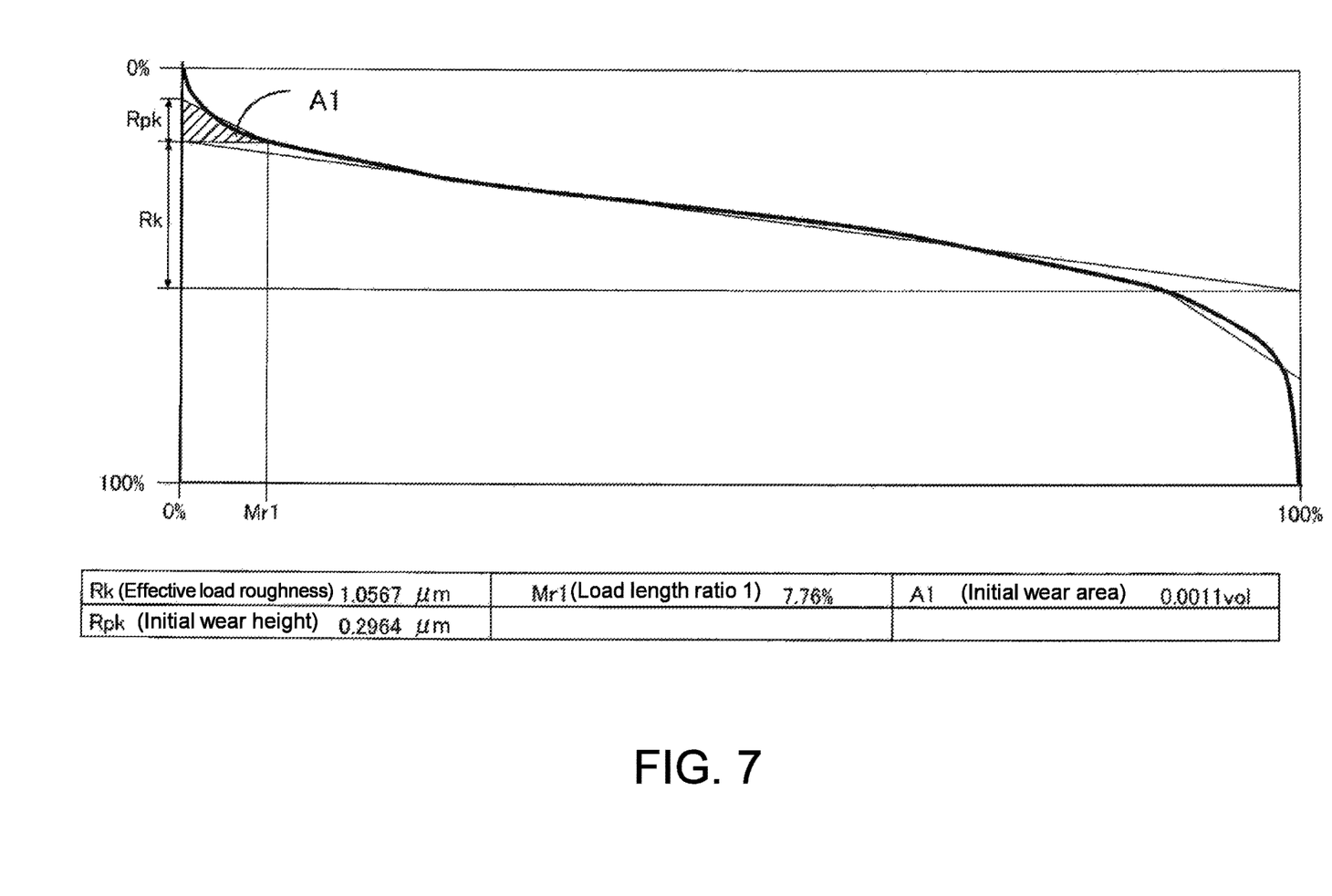
FIG. 7 is a load curve corresponding to FIG. 6.

FIG. 7 is a load curve corresponding to FIG. 6, and a state in which an initial wear height Rpk within a maximum value of the unevenness (a difference between the highest part and the lowers part of the unevenness) has been worn, that is, a state in which a shaded initial wear area A1 within the tops of the 37 protrusions 24c has been worn, is defined as an initial wear state.

A load length ratio 1Mrl is a ratio of a sum of widths of the worn tops of the 37 protrusions 24c which are high spot counts (HSCs) with respect to the length L (4 mm) in the radial direction. In the present embodiment, the first definition of a high spot count (HSC) which is an index of surface roughness of an object is the number of protrusions 24c that exceed a height of a load curve at the load length ratio 1Mrl. In addition, the second definition is the number of protrusions that exceed a height obtained by adding ½ of an effective load roughness Rk to a height (a starting point on the vertical axis in FIG. 6) at which a sum of areas of convex parts and a sum of areas of concave parts in a cross section of the protrusions 24c are the same. Whichever of these two definitions is used, the values of the high spot count (HSC) are substantially the same.

In the example in FIG. 7, since the load length ratio 1Mrl is 7.76%, 0.3104 mm corresponding to 7.76% of the radial length L (4 mm) is a sum of widths of the worn tops of the 37 protrusions 24c. Therefore, an average width on the top per protrusion 24c is 0.3104 mm÷37=0.0084 mm=8.4 µm, which is 16 µm or less, and it is possible to prevent the occurrence of cracks.

Figure 8:
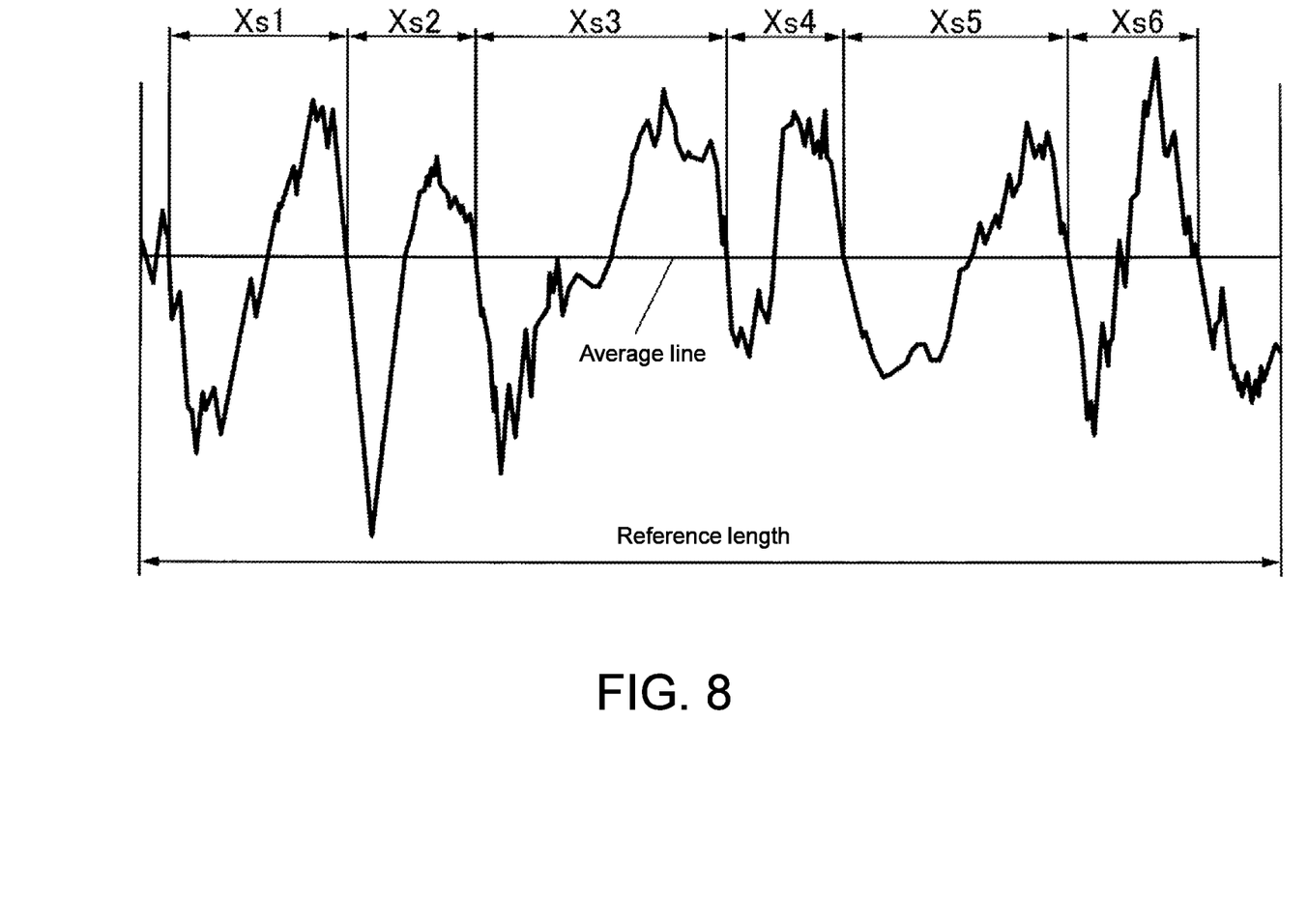
FIG. 8 is an explanatory diagram of the definition of an average length RSm of roughness curve elements.

An average length RSm (mean width of the profile elements) of roughness curve elements, which is another index of surface roughness of an object, is defined as an average value of pitch lengths Xs1, Xs2, Xs3 . . . Xsm on the average line of peaks and valleys in a range of a predetermined distance L as shown in FIG. 8.

$$RSm=(Xs1+Xs2+Xs3+\ldots+Xsm)/m$$

Therefore, L/RSm corresponds to the number of protrusions 24c on the average line at a predetermined distance L. In the present embodiment, the high spot count (HSC) which is the number of protrusions 24c on the straight line parallel to the average line at a predetermined distance L is replaced with L/RSm and the width of the protrusions 24c is evaluated.

Figure 9:
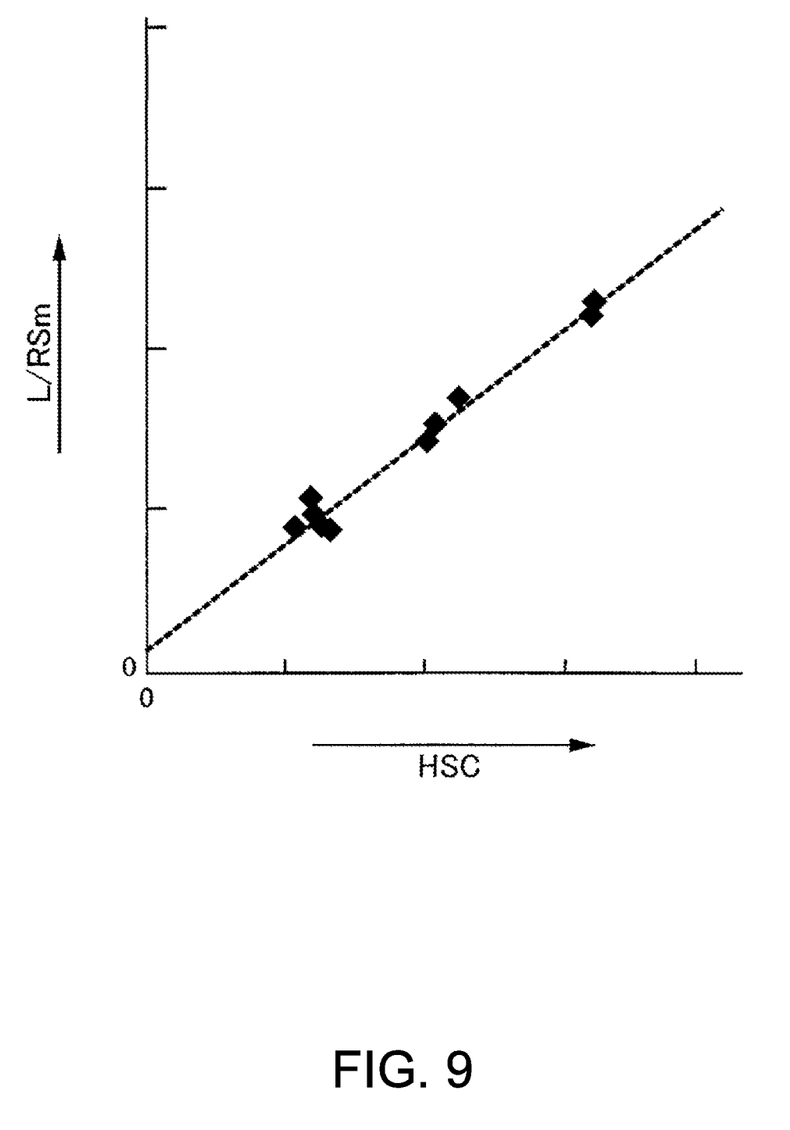
FIG. 9 is a graph showing a relationship between a high spot count (HSC) and a HSC conversion value L/RSm for an average length RSm of roughness curve elements.

FIG. 9 is a graph showing a relationship between a high spot count (HSC) and an HSC conversion value L/RSm for the average length RSm of the roughness curve elements, and it can be understood that L/RSm is slightly smaller than HSC, but both have a proportional relationship.

Figure 10:
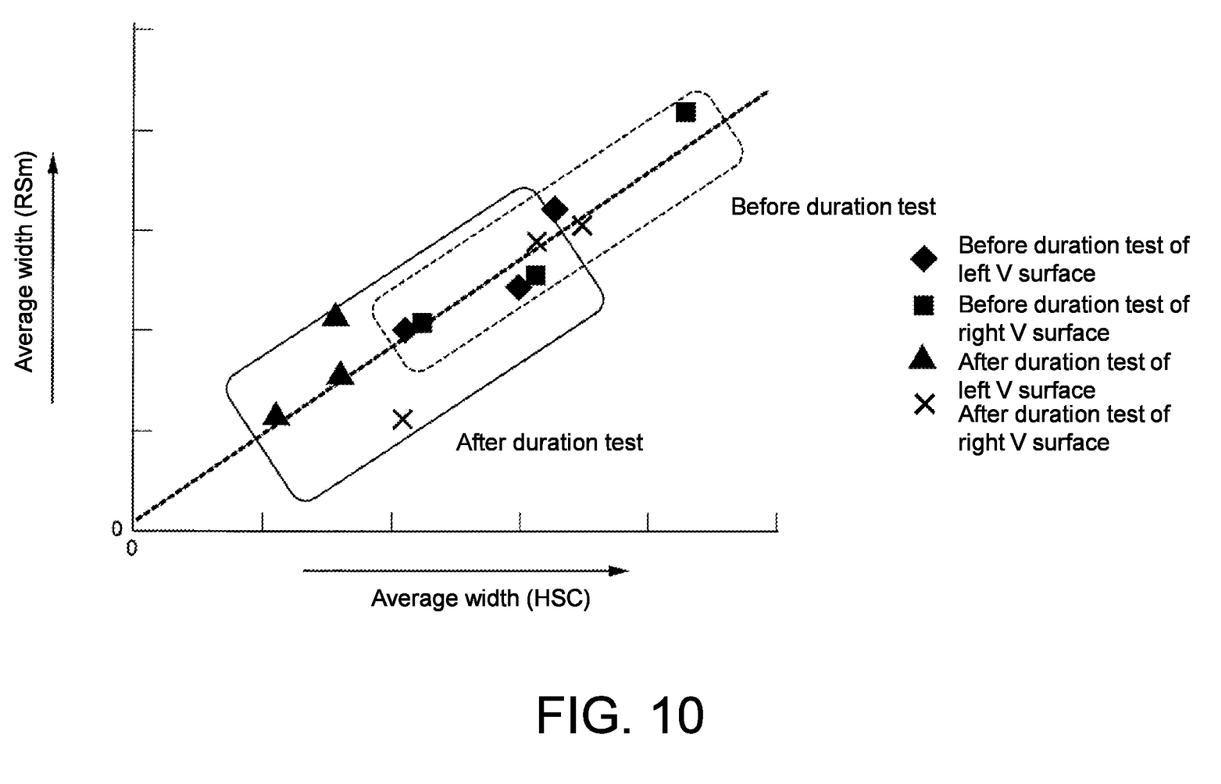
FIG. 10 is a graph showing a relationship between a width of a protrusion calculated from a high spot count (HSC) and a width of a protrusion calculated from an HSC conversion value L/RSm for an average length RSm of roughness curve elements.

FIG. 10 is a graph showing a relationship between an average width of the protrusions 24c calculated from the high spot count (HSC) and an average width of the protrusions 24c calculated from the HSC conversion value L/RSm for the average length RSm of the roughness curve elements, and it can be understood that, both before the duration test and after the duration test, the latter is slightly larger than the former, but both have a proportional relationship.

Since the average width of the protrusions 24c decreases as a lapping time for the V surface 24 increases, the lapping time is set such that the average width of the protrusions 24c calculated from the average length RSm of the roughness curve elements is a predetermined value (16 μm or less), and it is possible to obtain the V surface 24 having a desired average width of the protrusions 24c.

In this case, when the average width calculated from the average length RSm of the roughness curve elements is set to a predetermined value (16 μm or less), the value is further reduced when it is converted into the average width calculated from the high spot count (HSC) (refer to FIG. 10). Therefore, when the average length RSm of the roughness curve elements is used, the average width can be shifted to the smaller side and the durability against cracks can be improved compared to when the high spot count (HSC) is used.

Incidentally, there are problems that measurement accuracy of the high spot count (HSC) decreases depending on the shapes of peaks and valleys of an object and a measurement device with high accuracy needs to be used. On the other hand, since the average length RSm of the roughness curve elements can be measured with high accuracy using a general measurement device, when the average length RSm of the roughness curve elements is used in place of the high spot count (HSC), it is possible to easily and accurately evaluate the average width of the protrusions 24c.

Here, in a part on the inner side in the radial direction of the drive pulley 13, since a winding diameter of the metal belt 15 is small at a LOW gear ratio, and the number of metal elements 23 that are brought into contact therewith is small, there are problems that a contact surface pressure of the metal element 23 is higher than that of the part on the outer side in the radial direction and cracks easily occur. Therefore, when the size of the protrusions 24c on the V surface 24 is the same on the inner side and outer side in the radial direction, there is a possibility of durability against cracks decreasing in the part on the inner side in the radial direction of the V surface 24.

However, according to the present embodiment, when the rhomboid protrusions 24c formed on the V surface 24 by lapping are assumed to have a certain average radial width Wr, an average circumferential width Wt of the protrusions 24c decreases at a position on the inner side in the radial direction of the V surface 24 and an area of the protrusion 24c decreases, and an average circumferential width Wt of the protrusions 24c increases at a position on the outer side in the radial direction and an area of the protrusion 24c increases. Accordingly, the durability against cracks is uniformized in the entire area of the V surface 24. In addition, since a difference between the average circumferential widths Wt of the protrusions 24c on an inner side and outer side in the radial direction of the V surface 24 can be easily obtained by simply changing a ratio of a reciprocating speed of the polishing member 26 with respect to a rotational speed of the drive shaft 11, it is possible to reduce processing costs of the V surface 24.

While the average circumferential width Wt of the protrusions 24c on the V surface 24 of the pulley has been described above, since the average radial width Wr of the protrusions 24c of the V surface 24 of the pulley greatly influences wear on the pulley contact surface 25 of the metal element 23 during shifting, it is necessary to regulate a lower limit value of the average radial width Wr.

That is, when the gear ratio of the belt type continuously variable transmission T increases or decreases, since the pulley contact surface 25 of the metal element 23 relatively moves to the inner side or outer side in the radial direction with respect to the V surface 24 of the pulley, the pulley contact surface 25 of the metal element 23 that slides with respect to the V surface 24 of the pulley wears. When the average radial width Wr of the protrusions 24c on the V surface 24 of the pulley decreases, the durability against cracks in the protrusion 24c on the V surface 24 of the pulley is improved. However, when the protrusions 24c are densely arranged in the radial direction according to a decrease in the average radial width Wr, there is a problem that wear on the pulley contact surface 25 of the metal element 23 that rubs against the protrusion 24c is facilitated. Therefore, in order to reduce wear on the pulley contact surface 25 of the metal element 23, it is necessary to set a lower limit value of the average radial width Wr of the protrusions 24c on the V surface 24 of the pulley.

Figure 11:
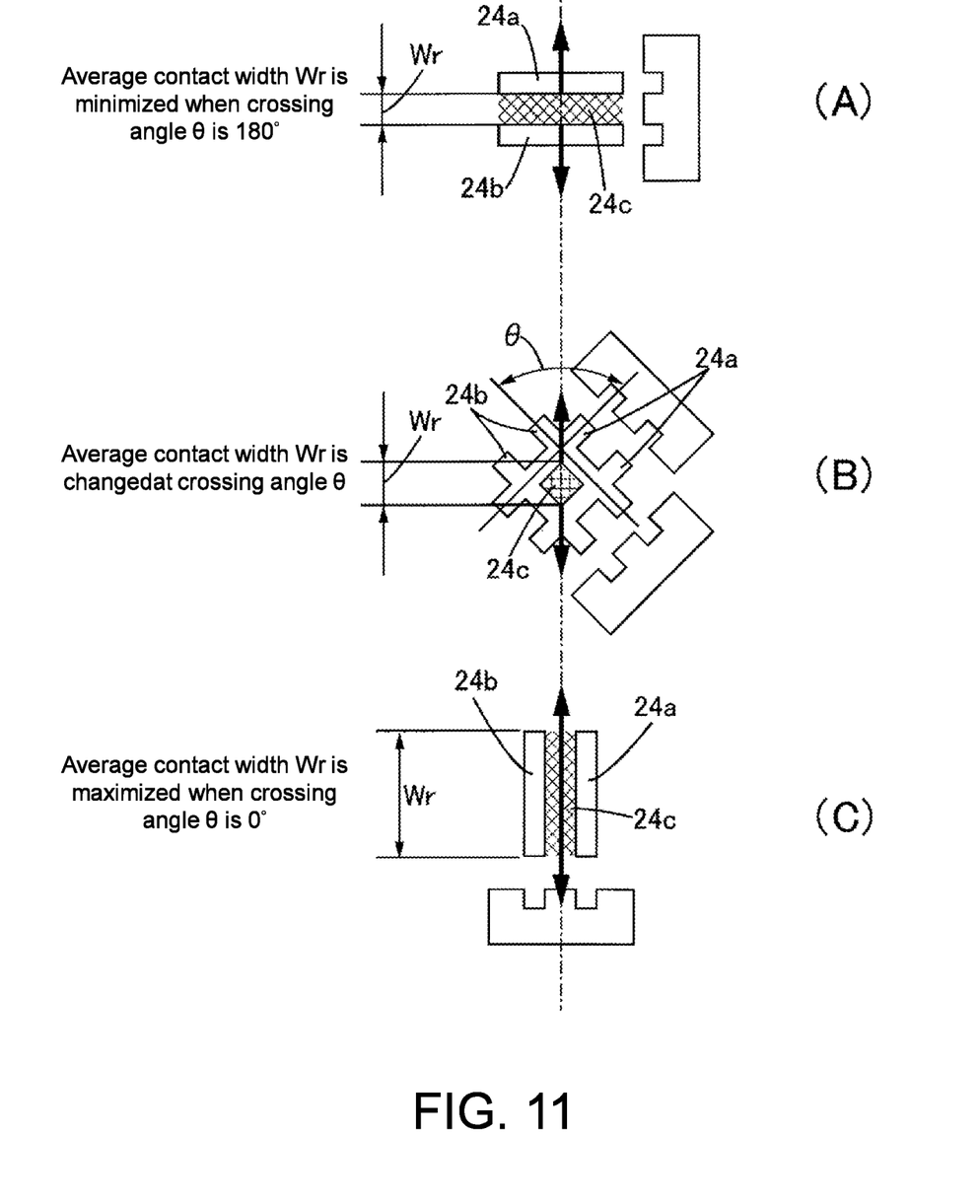
FIG. 11 is a schematic view of a protrusion on a V surface of a pulley corresponding to a part 11 in FIG. 4.

FIG. 11 is an enlarged schematic view of the part 11 in FIG. 4. Here, an angle at which a first groove 24a and a second groove 24b on the V surface 24 of the pulley cross each other with a radial line on the V surface 24 therebetween is defined as a crossing angle θ. Since the first groove 24a and the second groove 24b have a spiral shape (refer to FIG. 4), the crossing angle θ is lower in the part on the inner side in the radial direction of the V surface 24 and is higher in the part on the outer side in the radial direction of the V surface 24. As shown in (A) of FIG. 11, the maximum value of the crossing angle θ that can be obtained in the part on the outer side in the radial direction of the V surface 24 is 180° and the average radial width Wr of the protrusions 24c in this case is a minimum. In addition, as shown in (C) of FIG. 11, the minimum value of the crossing angle θ that can be obtained in the part on the inner side in the radial direction of the V surface 24 is 0° and the average radial width Wr of the protrusions 24c in this case is a maximum. As shown in (B) of FIG. 11, the crossing angle θ that can be obtained in the intermediate part in the radial direction of the V surface 24 is 0°<θ<180°, and the average radial width Wr of the protrusions 24c in this case has an intermediate value.

A durability test in which the belt type continuously variable transmission T was operated for a long time while a gear ratio was changed was performed. As a result, it was found that, when the average radial width Wr of the protrusions 24c on the V surface 24 of the pulley after the durability test was 4 μm or more, a wear amount of the pulley contact surface 25 on the metal element 23 that was in slidable contact with the protrusions 24c was limited, and even if the operation continued further, wear on the pulley contact surface 25 of the metal element 23 did not proceed.

Figure 12:
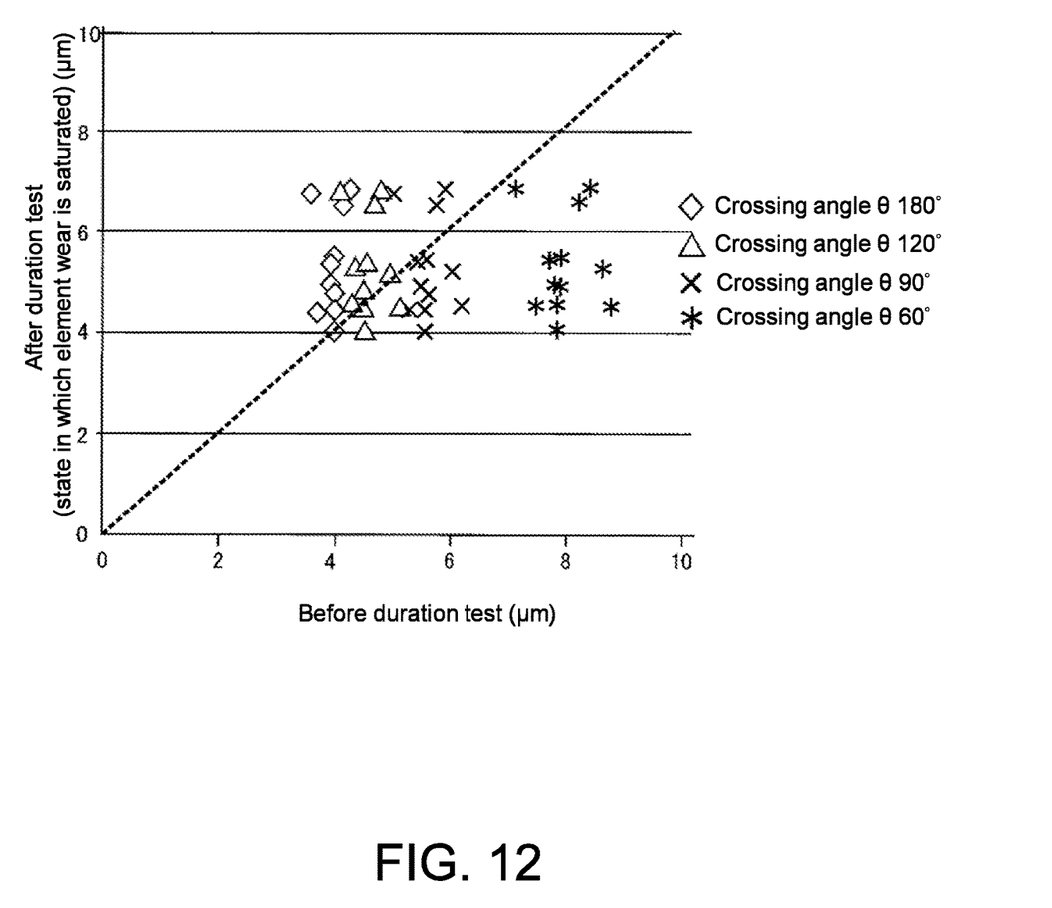
FIG. 12 is a graph showing a relationship between average radial widths Wr of protrusions on the V surface of the pulley before a durability test and after the durability test.

FIG. 12 is a graph in which the horizontal axis represents the average radial width Wr of the protrusions 24c before the durability test and the vertical axis represents the average radial width Wr of the protrusions 24c after the durability test. The mark ◇ corresponds to a case in which a crossing angle θ between the first groove 24a and the second groove 24b is 180° (refer to (A) of FIG. 11). As can be clearly understood from a distribution of the mark ◇ in FIG. 12, when the average radial width Wr of the protrusions 24c before the durability test is set to about 4 μm, since the average radial width Wr of the protrusions 24c after the durability test is within a range of about 4 μm to 7 μm, the average radial width Wr of the protrusions 24c after the durability test is 4 μm or more, and the durability of the metal element 23 against wear is ensured.

The reason why the average radial width Wr of the protrusions 24c increases due to the operation for the durability test is as follows. In many cases, the first groove 24a and the second groove 24b formed on the V surface 24 of the pulley have a V-shaped cross-sectional shape. When the top surface of the protrusion 24c wears due to the operation for the durability test, the first groove 24a and the second groove 24b become shallow, groove widths of the first groove 24a and the second groove 24b decrease and the average radial width Wr of the protrusions 24c increases.

While the mark ◊ in FIG. 12 corresponds to a case in which the crossing angle θ between the first groove 24a and the second groove 24b is 180°, when the crossing angle θ is changed to 120° (refer to the mark Δ), a crossing angle θ is changed to 90° (refer to the mark x), and a crossing angle θ is changed to 60° (refer to the mark *), the average radial width Wr of the protrusions 24c increases from about 4 μm to about 8 μm even if an interval between the first groove 24a and the second groove 24b is the same. Therefore, when the average radial width Wr of the protrusions 24c is set to 4 μm or more in the part on the outer side in the radial direction of the V surface 24 of the pulley at which the crossing angle θ is the largest, in the intermediate part in the radial direction and the part on the inner side in the radial direction of the V surface 24 of the pulley, the average radial width Wr is 4 μm or more with a margin and the requirement of the average radial width Wr can be automatically satisfied in the entire area of the V surface 24 of the pulley.

In addition, as described above, when the average radial width Wr of the protrusions 24c after the durability test is set to 16 μm or less, extension of minute cracks occurring on the top of the protrusion 24c is prevented and the durability of the V surface 24 of the pulley can be ensured.

While the embodiments of the present disclosure have been described above, various design modifications can be made without departing from the spirit and scope of the present disclosure.

For example, while the present disclosure is applied to the drive pulley 13 in the embodiment, the present disclosure can be applied to the driven pulley 14.

What is claimed is:

1. A pulley for a continuously variable transmission, wherein a V surface (24) of a pulley (13) with which a metal element (23) comes in contact includes a plurality of first grooves (24a) that extend spirally from a side of a rotation axis (L) of the pulley (13) to an outer side in a radial direction and one side in a circumferential direction, a plurality of second grooves (24b) that extend spirally from the side of the rotation axis (L) to the outer side in the radial direction and the other side in the circumferential direction, and a plurality of rhomboid protrusions (24c) that are surrounded by the first grooves (24a) and the second grooves (24b),
wherein an average circumferential width (Wt) of the protrusions (24c) is smaller at a position on the inner side in the radial direction than at a position on the outer side in the radial direction of the V surface (24).

2. The pulley for a continuously variable transmission according to claim 1,
wherein an average radial width (Wr) of the protrusions (24c) before a durability test is 4 μm or more and 16 μm or less.

3. A method of producing a pulley for a continuously variable transmission according to claim 1, comprising:
forming the first grooves (24a) and the second grooves (24b) on the V surface (24) by reciprocating a sandpaper (27) or a honing stone (27) that is brought into contact with the V surface (24) in the radial direction at a certain speed and lapping or honing the V surface (24) while rotating the pulley (13) around the rotation axis (L) at a certain rotational speed.

4. The method of producing a pulley for a continuously variable transmission according to claim 3,
wherein the average circumferential width (Wt) of the protrusions (24c) is evaluated based on an average length (RSm) of roughness curve elements on the V surface (24), and a lapping time or a honing time of the V surface (24) is set so that the average circumferential width (Wt) is a predetermined value or less.

5. A method of producing a pulley for a continuously variable transmission according to claim 2, comprising:
forming the first grooves (24a) and the second grooves (24b) on the V surface (24) by reciprocating a sandpaper (27) or a honing stone (27) that is brought into contact with the V surface (24) in the radial direction at a certain speed and lapping or honing the V surface (24) while rotating the pulley (13) around the rotation axis (L) at a certain rotational speed.

6. The method of producing a pulley for a continuously variable transmission according to claim 5,
wherein the average circumferential width (Wt) of the protrusions (24c) is evaluated based on an average length (RSm) of roughness curve elements on the V surface (24), and a lapping time or a honing time of the V surface (24) is set so that the average circumferential width (Wt) is a predetermined value or less.

* * * * *